(12) United States Patent
Johri et al.

(10) Patent No.: US 11,260,848 B2
(45) Date of Patent: Mar. 1, 2022

(54) METHODS AND SYSTEM FOR OPERATING AN ENGINE IN THE PRESENCE OF ENGINE SENSOR DEGRADATION

(71) Applicant: Ford Global Technologies, LLC, Dearborn, MI (US)

(72) Inventors: Rajit Johri, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 16/438,314

(22) Filed: Jun. 11, 2019

(65) Prior Publication Data
US 2020/0391725 A1 Dec. 17, 2020

(51) Int. Cl.
| | | |
|---|---|---|
| *B60W 20/50* | (2016.01) | |
| *B60W 10/02* | (2006.01) | |
| *B60W 10/06* | (2006.01) | |
| *B60W 10/08* | (2006.01) | |
| *B60W 20/10* | (2016.01) | |

(52) U.S. Cl.
CPC ............ *B60W 20/50* (2013.01); *B60W 10/02* (2013.01); *B60W 10/06* (2013.01); *B60W 10/08* (2013.01); *B60W 20/10* (2013.01); *B60W 2510/0628* (2013.01); *B60W 2510/0671* (2013.01); *B60W 2510/242* (2013.01); *B60W 2510/305* (2013.01); *B60W 2520/10* (2013.01); *B60W 2540/10* (2013.01)

(58) Field of Classification Search
CPC ...... B60W 20/50; B60W 10/02; B60W 10/06; B60W 10/08; B60W 20/10; B60W 2520/10; B60W 2510/0628; B60W 2510/0671; B60W 2510/305; B60W 2540/10; B60W 2510/242; B60W 2050/0297; B60W 50/029; B60W 2710/0666; B60W 2710/083; Y02T 10/62
See application file for complete search history.

(56) References Cited

U.S. PATENT DOCUMENTS

| | | | |
|---|---|---|---|
| 2013/0296098 A1* | 11/2013 | Gibson | ............... B60W 10/023 477/3 |
| 2015/0025720 A1 | 1/2015 | Bae et al. | |
| 2015/0165890 A1 | 6/2015 | Liang et al. | |

* cited by examiner

*Primary Examiner* — Brian P Sweeney
(74) *Attorney, Agent, or Firm* — David Kelley; McCoy Russell LLP (57) ABSTRACT

Systems and methods for operating a vehicle that includes an engine and an integrated starter/generator are described. In one example, torque generated via the engine is based on a requested driveline torque and a torque of an electric machine when degradation of an engine sensor is present. The torque generated via the engine may be adjusted responsive to a requested engine torque and a feedback engine torque that is based on output of an engine airflow sensor.

19 Claims, 5 Drawing Sheets

METHODS AND SYSTEM FOR OPERATING AN ENGINE IN THE PRESENCE OF ENGINE SENSOR DEGRADATION

FIELD

The present description relates to methods and a system for a hybrid vehicle that includes an integrated starter/generator for propelling a vehicle and starting an engine.

BACKGROUND AND SUMMARY

A hybrid vehicle may include an internal combustion engine and an electric machine to provide propulsion torque. The internal combustion engine may be issued torque commands that may be based on driver demand input torque and vehicle operating conditions. One or more engine sensors may provide feedback information that may be indicative of an amount of torque that is being produced by the engine so that engine torque commands may be adjusted to meet the driver demand torque. For example, the engine sensors may include a manifold absolute pressure (MAP) sensor or a mass airflow (MAF) sensor that indicate the amount of air that is flowing through the engine. The amount of air that is flowing through the engine may be indicative of the amount of torque that is produced by the engine. Thus, an amount of engine torque that is produced by the engine as inferred from an amount of airflow through the engine may be compared to the amount of engine torque requested. If the engine torque determined from engine airflow is less than the requested amount of engine torque, the throttle opening amount may be increased so that the engine generates the requested amount of engine torque. If the engine torque determined from the engine airflow is greater than the requested amount of engine torque, the throttle opening amount may be decreased so that the engine generates the requested amount of engine torque. However, if the engine airflow sensor becomes degraded, it may be difficult to accurately estimate the amount of torque that is being generated via the engine. Further, if the engine torque estimate is in error, then the electric machine torque estimate may be in error such that the driver demand torque may not be met because the electric machine torque may depend on the engine torque estimate to deliver the requested driver demand torque. Further still, if the electric machine torque cannot be determined with a desired accuracy when an engine torque estimate has lower accuracy, then the vehicle's electric energy storage device may not be charged due to the possibility of inducing an engine stall condition.

The inventors herein have recognized the above-mentioned issues and have developed a powertrain operating method, comprising: adjusting a load of an electric machine via a controller in response to degradation of an engine sensor, the load of the electric machine adjusted according to an amount of power output from a high voltage battery; and adjusting output of an engine responsive to accelerator pedal position and the load of the electric machine in response to the degradation of the engine sensor.

By adjusting a load of an electric machine responsive to degradation of an engine sensor, it may be possible to provide the technical result of generating a driveline torque that is close to driver demand torque while reducing the possibility of inducing an engine stall. In particular, a load that the electric machine supplies to the engine may be adjusted to a level that is based on an amount of power that is drawn from an electric energy storage device. At the same time, the requested engine output torque may follow an accelerator pedal position without feedback from and engine airflow sensor. Thus, requested electric machine output torque may be decoupled from the requested engine output torque. The requested electric machine output torque may be limited so that the possibility of an engine stall may be reduced by limiting the requested electric machine torque to a fraction of the requested engine torque.

The present description may provide several advantages. In particular, the approach may provide a driveline torque that is closer to a requested driver demand torque. Further, the approach may reduce the possibility of an engine stalling when an engine airflow sensor is degraded. In addition, the approach may be implemented without significantly increasing system cost and complexity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
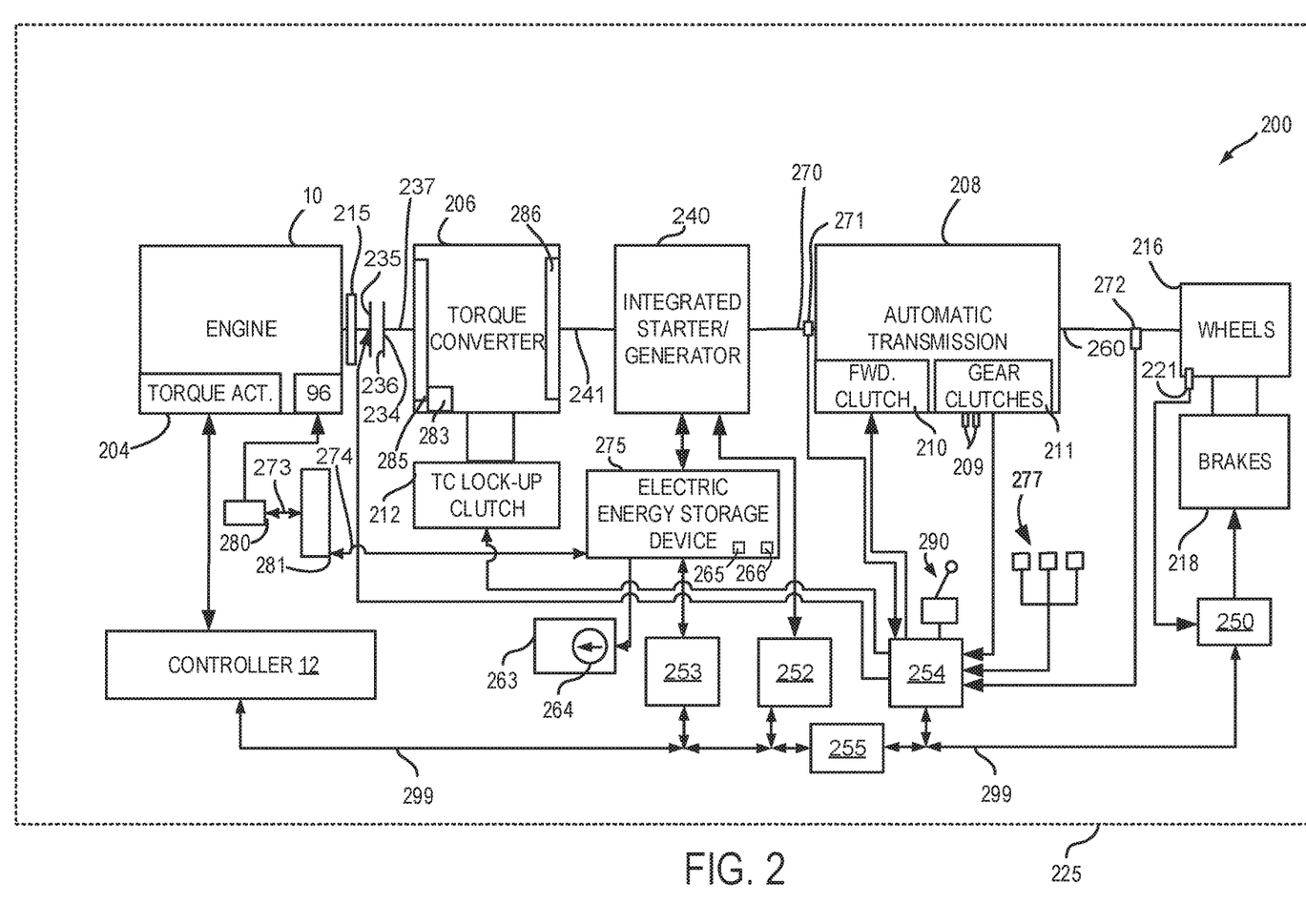
FIG. 2 is a schematic diagram of a vehicle driveline that includes the engine of FIG. 1.
Figure 3:
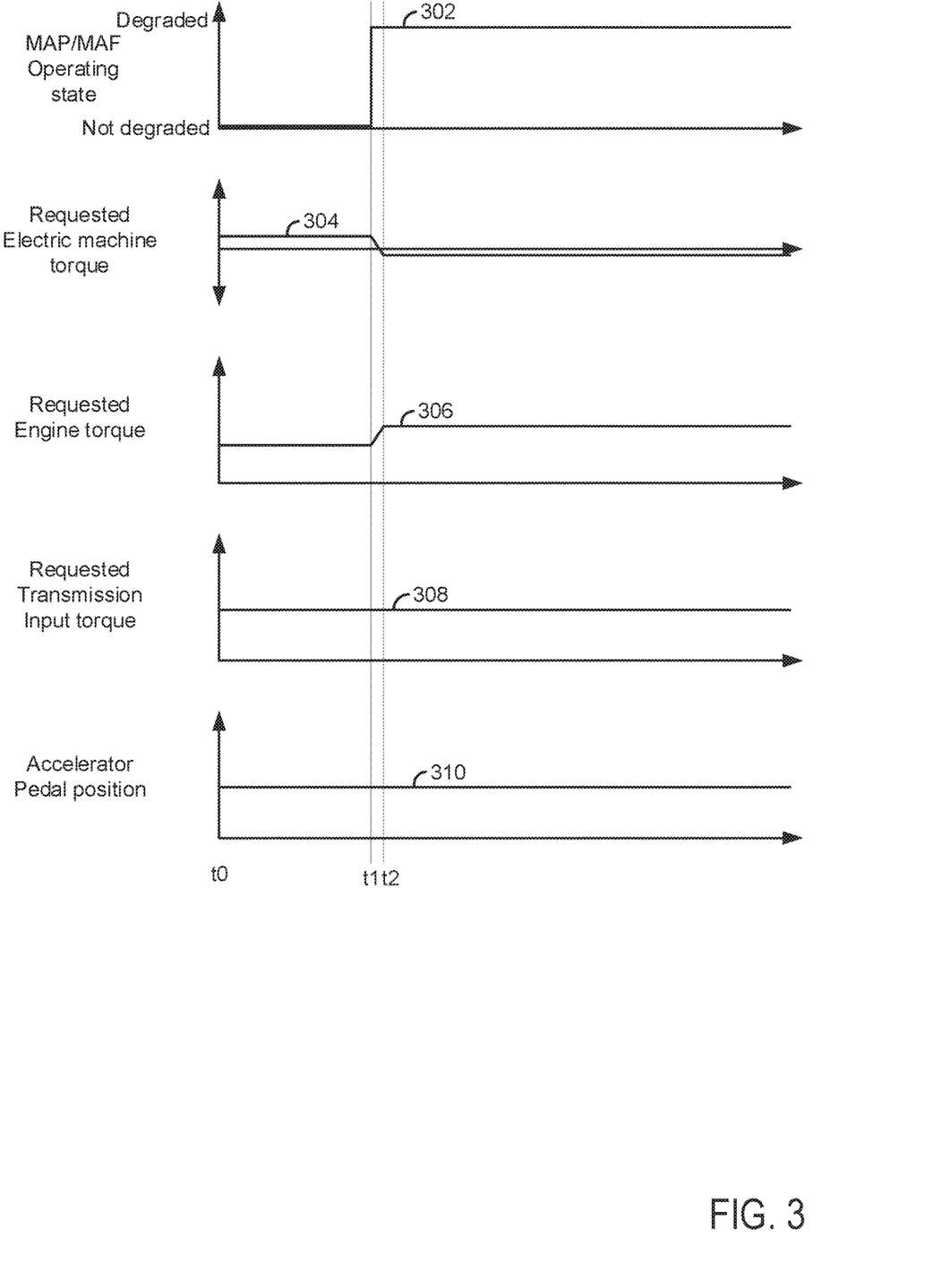
FIG. 3 shows an example sequence during which an engine airflow sensor becomes degraded.

The present description is related to operating a hybrid vehicle that includes an engine that may be selectively coupled to a driveline that includes an electric machine. The engine and the electric machine may provide propulsive force to move a vehicle. The electric machine may also generate electrical power that may be stored in an electric energy storage device for consumption at a later time. The engine may be of the type shown in FIG. 1 or it may be a diesel engine. The engine and the electric machine may be included in a driveline configuration as shown in FIG. 2. The engine and electric machine may be operated according to the method of FIG. 4 to provide the operating sequence that is shown in FIG. 3. The electric machine torque may be adjusted as a function of accelerator pedal position and torque converter impeller speed as shown in FIG. 5 only when an engine sensor is degraded.

Figure 1:
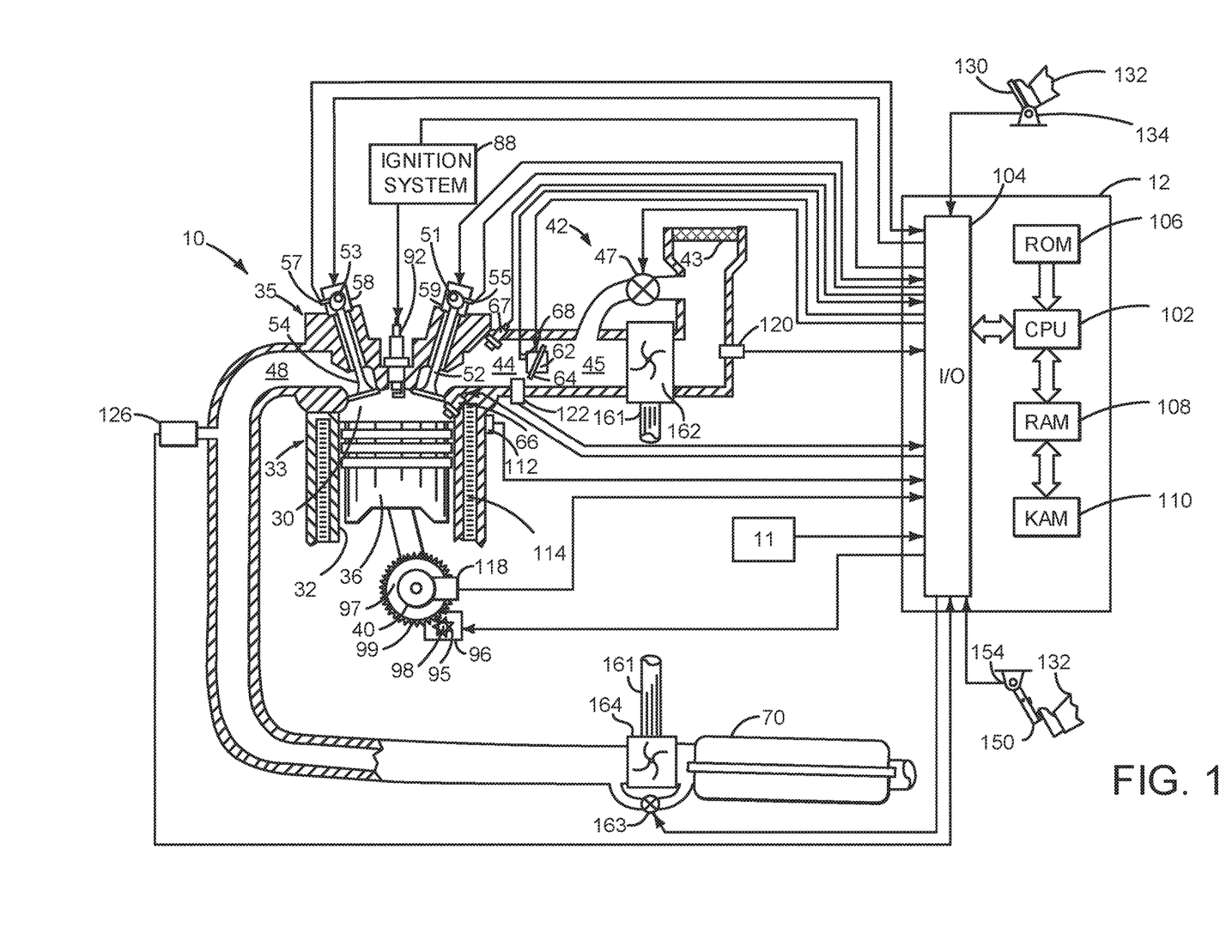
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and/or electric machine 240. Engine 10 may be started via optional engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

Bi-directional DC/DC converter 281 may transfer electrical energy from a high voltage buss 274 to a low voltage buss 273 or vice-versa. Thus, low voltage battery 280 may be charged via high voltage electric energy storage device 275. Low voltage battery 280 is electrically coupled to low voltage buss 273. Electric energy storage device 275 is electrically coupled to high voltage buss 274. Voltage of electric energy storage device 275 may be determined via voltage sensor (e.g., analog to digital converter) 265 and the amount of current entering or exiting the electric energy storage device 275 may be determined via current sensor 266. High voltage electric energy storage device 275 may supply electric power to air conditioning or climate control system 263. Climate control system may include an electrically driven compressor 264 that compresses a refrigerant (not shown) for cooling and/or heating a passenger compartment (not shown). Low voltage battery 280 (e.g., the voltage of battery 280 is less than the voltage of electric energy storage device 275 when both devices are fully charged) selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that may pressurize fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. Torque converter 206 may multiply torque of ISG 240 to rotate engine 10 when driveline disconnect clutch 236 is fully closed. Thus, the torque of ISG 240 may be increased via torque converter 206 to rotate engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the engine torque that flows through torque converter 206 and ISG torque is less than a transmission input torque limit (e.g., a threshold value not to be exceeded), the torque is delivered to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging power (e.g., a negative ISG torque that may resist driveline rotation) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque (e.g., desired or requested powertrain wheel torque) based on vehicle speed and brake pedal position. Vehicle system controller 255 then allocates a fraction of the negative desired wheel torque to the ISG 240 and the engine 10. Vehicle system controller may also allocate a portion of the requested braking torque to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative torque to transmission input shaft 270, but negative torque provided by ISG 240 and engine 10 may be limited by transmission controller 254 which outputs a transmission input shaft negative torque limit (e.g., not to be exceeded threshold value). Further, negative torque of ISG 240 may be limited (e.g., constrained to less than a threshold negative threshold power) based on operating conditions of electric energy storage device 275, by vehicle system controller 255, or electric machine controller 252. Any portion of desired negative wheel torque that may not be provided by ISG 240 because of transmission or ISG limits may be allocated to engine 10 and/or friction brakes 218 so that the desired wheel torque is provided by a combination of negative torque (e.g., torque absorbed) via friction brakes 218, engine 10, and ISG 240.

Accordingly, torque or power control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. Engine braking torque or negative engine torque may be provided by rotating the engine with the engine generating torque that is insufficient to rotate the engine. Thus, the engine may generate a braking torque via operating at a low torque while combusting fuel, with one or more cylinders deactivated (e.g., not combusting fuel), or with all cylinders deactivated and while rotating the engine. The amount of engine braking torque may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., threshold negative wheel torque not to be exceeded) to the vehicle system controller 255 so that negative ISG power does not cause the wheel power limit to be exceeded. For example, if controller 250 issues a negative wheel torque limit of 50 Newton-meters (Nm), ISG torque is adjusted to provide less than 50 Nm (e.g., 49 Nm) of negative torque at the wheels, including compensating for transmission gearing.

Thus, the system of FIGS. 1 and 2 provides for a system, comprising: an engine in a hybrid vehicle driveline; an electric machine in the hybrid driveline; a driveline disconnect clutch that selectively couples the engine to the electric machine; and a controller including executable instructions stored in non-transitory memory to maintain the driveline disconnect clutch in a closed state in response to degradation of an engine airflow sensor. The system further comprises additional instructions to adjust a load that the electric machine applies to the engine in response to degradation of an engine sensor, the load adjusted according to an amount of power output from a high voltage battery. The system further comprises additional instructions to adjust a load that the electric machine applies to the engine in response to degradation of an engine sensor, the load adjusted according to an amount of electric power consumed via electric power consumers of a vehicle. The system includes where the electric power consumers include an electrically operated air conditioning system. The system includes where the electric power consumers include a DC/DC converter. The system includes where the DC/DC converter transfers electric power between a first electric energy storage device and a second electric energy storage device.

Figure 4:
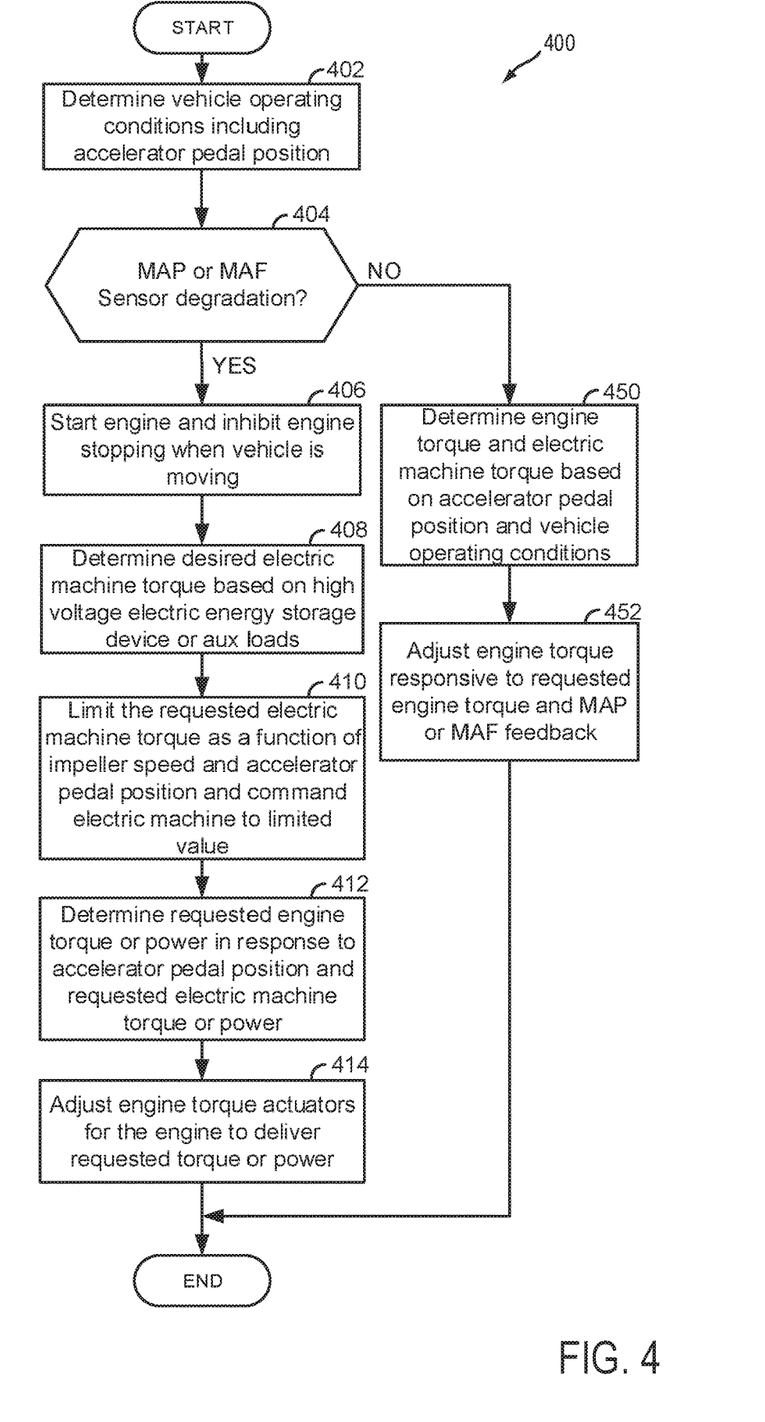
FIG. 4 shows a method for operating a driveline in the presence of engine sensor degradation.
Figure 5:
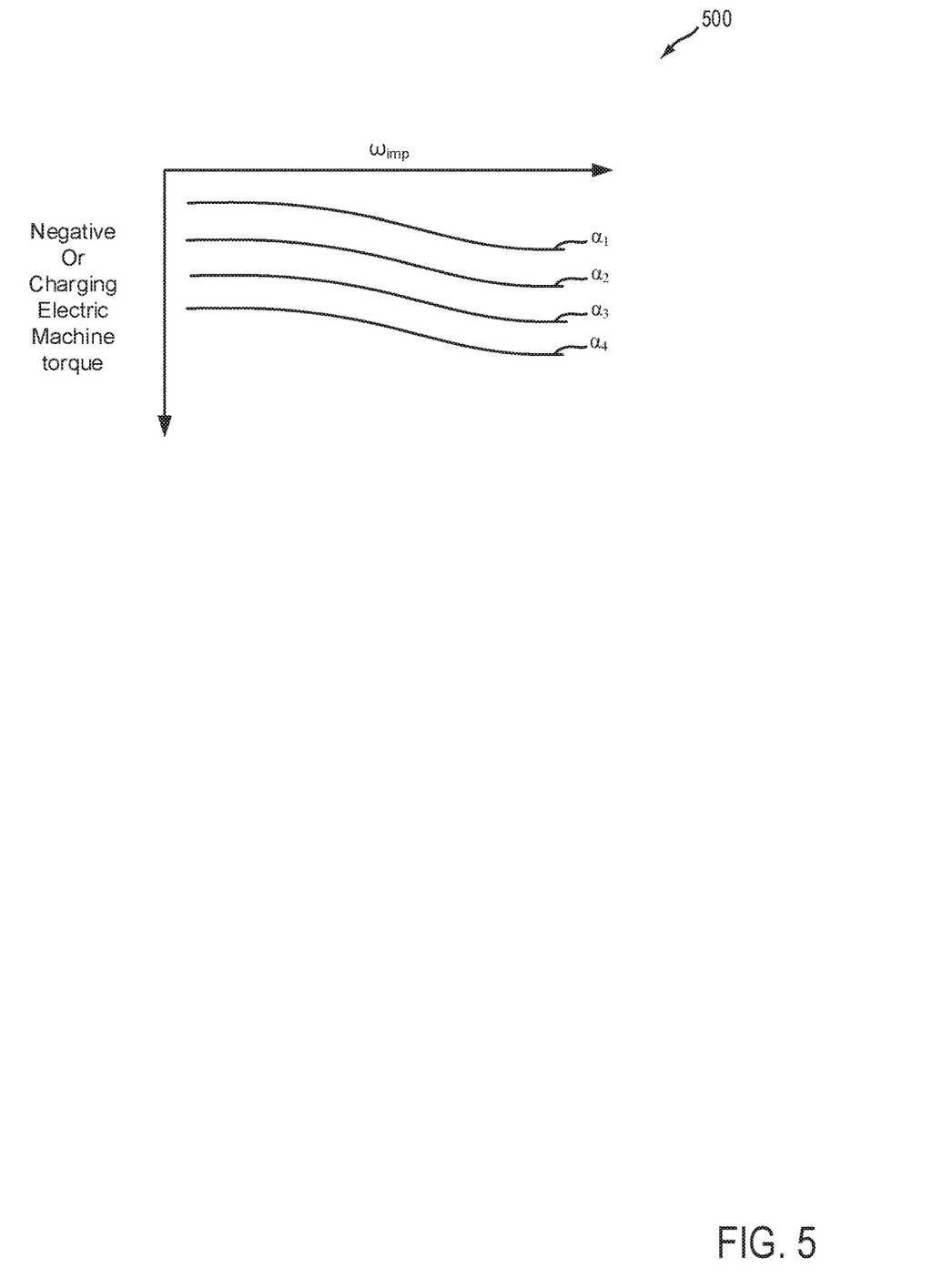
FIG. 5 shows a plot of an electric machine torque request that is a function of torque converter impeller speed and accelerator pedal position.

Referring not to FIG. 3, plots of a prophetic vehicle operating sequence according to the method of FIG. 4 and the systems of FIGS. 1 and 2 are shown. The plots are aligned in time and occur at a same time. The vertical lines at t0-t1 show particular times of interest.

The first plot from the top of FIG. 3 is a plot of an operating state of an engine airflow sensor (e.g., a manifold absolute pressure (MAP) sensor or of a mass air flow (MAF) sensor) versus time. The vertical axis represents the operating state of the engine sensor and the engine sensor is in a degraded state when trace 302 is at a higher level near the level of the "degraded" label. The engine sensor is not degraded when trace 302 is at a lower level near the horizontal axis. The horizontal axis represents time and the time increases from the left side of the figure to the right side of the figure. Trace 302 represents the engine airflow sensor operating state.

The second plot from the top of FIG. 3 is a plot of requested electric machine torque versus time. The vertical axis represents the requested electric machine torque and the requested electric machine torque is positive (e.g., providing torque to the driveline) when trace 304 is above the horizontal axis. The requested electric machine torque is negative (e.g., consuming or absorbing torque from the driveline to generate electric charge) when trace 304 is below the horizontal axis. The horizontal axis represents time and the time increases from the left side of the figure to the right side of the figure. Trace 304 represents the requested electric machine torque.

The third plot from the top of FIG. 3 is a plot of requested engine torque versus time. The vertical axis represents the requested engine torque and the requested engine torque increases in the direction of the vertical axis arrow. The horizontal axis represents time and the time increases from the left side of the figure to the right side of the figure. Trace 306 represents the requested engine torque.

The fourth plot from the top of FIG. 3 is a plot of requested transmission input shaft torque (e.g., a driver demand torque at shaft 270) versus time. The vertical axis represents the requested transmission input shaft torque and the requested transmission input shaft torque increases in the direction of the vertical axis arrow. The horizontal axis represents time and the time increases from the left side of the figure to the right side of the figure. Trace 308 represents the requested transmission input shaft torque.

The fifth plot from the top of FIG. 3 is a plot of accelerator pedal position versus time. The vertical axis represents accelerator pedal position and accelerator pedal position increases in the direction of the vertical axis arrow. The horizontal axis represents time and the time increases from the left side of the figure to the right side of the figure. Trace 310 represents the accelerator pedal position.

At time t0, the requested engine torque and the requested electric machine torque are positive so that the engine and electric machine supply positive torque to the driveline to meet the requested transmission input shaft torque. The engine sensor is not degraded and the accelerator pedal is partially applied. The torque converter clutch (not shown) is locked so that the requested engine torque and the requested electric machine torque are supplied to the transmission input shaft. The requested engine torque is based on accelerator pedal position and from feedback provided via the engine airflow sensor. Further, the electric machine torque is equal to the driver demand torque minus the engine torque.

At time t1, the engine airflow sensor is determined to be degraded while the accelerator pedal position is unchanged. The torque converter clutch remains locked in a closed position so that engine torque may be transferred to the transmission. The requested transmission input shaft torque also remains at its previous level. The requested electric machine torque begins to transition from a positive torque to a negative torque. The requested electric machine torque is no longer based on driver demand torque and engine torque. Instead, the requested electric machine torque is based on an amount of electric power that is being drawn from the high voltage electric energy storage device. This allows the electric machine torque to be determined independent of engine torque so that errors in engine torque do not result in error in electric machine torque. The requested engine torque begins to be increased and it is determined solely from the accelerator pedal position.

At time t2, the engine airflow sensor remains in a degraded state while the accelerator pedal position is unchanged. The torque converter clutch remains locked in a closed position so that engine torque may be transferred to the transmission. The requested transmission input shaft torque also remains at its previous level. The requested electric machine torque is now a negative torque and it levels out to a value that is based on an amount of electric power that is being drawn from the high voltage electric energy storage device. The engine torque has increased and it levels off at a level that is based solely on the accelerator pedal position. Any errors in engine torque generation or determination are not carried through to generate errors in the electric machine torque. Further, the electric machine torque may be limited to less than a threshold torque so that the possibility of the engine stalling may be reduced.

In this way, engine torque generation and electric machine torque generation may be adjusted in the presence of engine sensor degradation so that the possibility of engine stalling may be reduced. Further, electric machine torque production is independent of engine torque generation when engine sensor degradation is present so that electric machine torque may not be influenced by engine torque error.

Referring now to FIG. 4, a flow chart of a method for operating a driveline of a vehicle in the presence of engine sensor degradation is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to powertrain speed (e.g., speed of ISG 240 or input speed to a torque converter, or alternatively, speed of a transmission input shaft), engine speed, engine temperature, electric energy storage device state of charge (SOC), accelerator pedal position, operating states of the various driveline sensors, and driver demand torque (e.g., an amount of torque requested by the driver to be input to the transmission). Method 400 proceeds to 404.

At 404, method 400 judges if an engine sensor is degraded. The engine sensor may be an intake manifold absolute pressure sensor (e.g., MAP sensor 122 of FIG. 1) or a mass air flow sensor (e.g., MAF sensor 120 of FIG. 1). Method 400 may judge that a MAP or MAF sensor is degraded if the output voltage or signal of the MAP or MAF sensor is lower or higher than an expected output of the sensor. If method 400 judges that an engine sensor is degraded, the answer is yes and method 400 proceeds to 406. Otherwise, the answer is no and method 400 proceeds to 450.

At 450, method 400 determines a requested engine torque and a requested electric machine torque based on a driver demand torque. In one example, the driver demand torque may be determined via indexing or referencing a table or function according to accelerator pedal position and vehicle speed. The present accelerator pedal position and the present vehicle speed reference a table cell or a function value that is unique for the present accelerator pedal position and vehicle speed. The value in the table cell or function may be empirically determined via operating a vehicle on a chassis dynamometer and adjusting values in the table or function until a desired level of vehicle performance is achieved. The value output by the table or function is a driver demand torque. The driver demand torque is a requested torque at a predetermined location within the driveline (e.g., at the transmission input shaft). Method 500 requests and engine torque and an electric machine torque to meet the driver demand torque. In one example, the requested electric machine torque is equal to the driver demand torque minus the requested engine torque, or alternatively, the driver demand torque is equal to the requested engine torque plus the requested electric machine torque. Thus, the electric machine torque may be determined from the driver demand torque and the requested engine torque. The requested engine torque may be based on the present vehicle operating conditions including, but not limited to, the driver demand torque and the battery state of charge. The electric machine torque may also be adjusted to provide charging of the electric energy storage device or to provide positive torque to the driveline during high driver demand torque conditions. Method 400 proceeds to 452.

At 452, method 400 adjusts the requested engine torque responsive to the actual engine torque. The actual engine torque may be based on an engine airflow amount that may be determined from a MAF sensor or a MAP sensor and speed-density. In one example, the engine air flow amount is applied to reference a table or function that outputs an actual engine torque amount. The values in the table may be determined via operating the engine on a dynamometer and recording engine torque for different engine airflow and engine speed combinations. The table or function outputs an actual engine torque estimate and the actual engine torque estimate is subtracted from the requested engine torque to generate an engine torque error. The engine torque error may then be multiplied by proportional and integral multiplication factors and the result of the multiplications may be added to the requested engine torque. Thus, the requested engine torque may be adjusted as a function of or based upon the engine torque error. The requested engine torque is then commanded of the engine via adjusting a torque actuator (e.g., a throttle, cam timing, and/or a fuel injection amount). In this way, the requested engine torque may be adjusted via feedback from an engine sensor to meet the requested engine torque amount. Method 400 proceeds to exit.

It should be noted that during some conditions, such as driver demand torque less than a threshold torque, method 400 may request zero engine torque so that the engine may be automatically stopped (e.g., stopped via the controller without a human driver specifically requesting an engine stop via a dedicated input that has a sole function of starting and/or stopping the engine, such as a key switch or push-button) via the controller. The engine may be automatically stopped via the controller and the driveline disconnect clutch may be fully opened to conserve fuel during low driver demand torque conditions. The vehicle may be propelled solely via the electric machine (e.g., ISG 240) during such conditions.

At 406, method 400 starts the engine (e.g., the engine is rotated via an electric machine or vehicle inertia and combustion in the engine begins) if the engine is not running (e.g., rotating and combusting fuel). The engine is started so that the high voltage electric energy storage device may be charged and so that the high voltage electric energy storage device does not fully discharge while the engine sensor is degraded. Method 400 may also fully close and lock the driveline disconnect clutch so that torque produced via the engine may be applied to propel the vehicle and charge the high voltage electric energy storage device. Method 400 also prohibits automatic engine stopping in response to engine sensor degradation, and method 400 may prevent opening of the driveline disconnect clutch when engine sensor degradation is present so that the engine may be kept running to supply electric charge to the vehicle, thereby preventing discharge of electric energy storage devices. By prohibiting automatic engine stopping, method 400 may ensure that torque is available to propel the vehicle and to charge the high voltage electric energy storage device. Method 400 proceeds to 408.

At 408, method 400 determines a desired electric machine torque amount based on an amount of electric power delivered from a high voltage electric energy storage device (e.g., 275 of FIG. 2) to electric power consumers (e.g., DC/DC converter 281 and electrically operated climate control system 263 shown in FIG. 2). The amount of electric power supplied by or from the high volt electric energy storage device to the electric power consumers may be determined via the following equation:

$$P_{bat}=V_{bat} \cdot I_{bat}$$

where $P_{bat}$ is the amount of electric power delivered from the high voltage electric energy storage device to electric power consumers, $V_{bat}$ is the voltage of the electric energy storage device, and $I_{bat}$ is the amount of current entering or exiting the electric energy storage device. Alternatively, the amount of power consumed via electric power consumers may be determined via the following equation:

$$P_{load}=P_{DCDC}+P_{eAC}$$

where $P_{load}$ the amount of electrical power consumed by electric power consumers, $P_{DCDC}$ is an amount of electric power that is consumed via the DC/DC converter (e.g., 281 of FIG. 2), and $P_{eAC}$ is the amount of electric power that is consumed via the electrically operated air conditioning system (e.g., 263 of FIG. 2). These power consumption levels may be communicated to the vehicle system controller via the CAN. The requested or desired electric machine torque may be determined via one of the following equations:

$$\tau_{elec}^{req} = \frac{P_{bat}}{\omega_{imp}} \text{ or } \tau_{elec}^{req} = \frac{P_{load}}{\omega_{imp}}$$

where $\tau_{elec}^{req}$ is the requested electric machine torque and $\omega_{imp}$ is the torque converter impeller speed. Method 400 proceeds to 410 after determining the electric machine torque.

At 410, method 400 limits or prevents the requested electric machine torque as a function of torque converter impeller speed so that the possibility of inducing an engine stall condition may be reduced. The limited requested electric machine torque may be determined via the following equation:

$$\tau_{elec}^{lim\_req}=\min(0,\max(\tau_{elec}^{req},f(\omega_{imp},\alpha))$$

where $\tau_{elec}^{lim\_req}$ is the limited requested electric machine torque, min is a function that returns the lesser of two arguments (e.g., 0 and $\max(\tau_{elec}^{req}, f(\omega_{imp}, \alpha))$), max is a function that returns a greater of two arguments (e.g., $\tau_{elec}^{req}$, $f(\omega_{imp}, \alpha)$), $f(\omega_{imp}, \alpha)$ is a function that outputs a charging or negative electric machine torque that is a function of torque converter impeller speed $\omega_{imp}$ and accelerator pedal position $\alpha$. An example of function f is shown in FIG. 5. Thus, the above equation outputs a value that is a minimum of zero and a second value, the second value is a maximum of the requested electric machine torque and output of the function f. This equation ensures that the electric machine torque is a charging or negative torque and that it is small enough to reduce the possibility of engine stalling. However, the electric machine torque magnitude may be increased as engine speed increases, which may tend to reduce the possibility of engine stalling. The electric machine torque is commanded to the limited requested electric machine torque. Method 400 proceeds to 412.

At 412, method 400 determines the requested engine torque. In one example, the requested engine torque may be determined via the following equation:

$$\tau_{eng}^{req}=f(\alpha)-\tau_{elec}^{lim\_req}$$

where $\tau_{eng}^{req}$ is the requested engine torque and f is a function that returns an engine torque based on throttle position $\alpha$. The limited requested electric machine torque is subtracted from the engine torque that is determined from accelerator pedal position so that the requested engine torque is increased to compensate for the limited requested electric machine torque. Method 400 proceeds to 414.

At 414, method 400 commands the engine torque to the requested engine torque. The engine may be commanded to the requested engine torque via adjusting one or more torque actuators such as a throttle, cam timing, spark advance, and/or fuel injection timing. Method 400 proceeds to exit.

In this way, errors in the determination of engine torque may not be introduced to the electric machine torque command. Further, the electric machine torque is limited or constrained to less than a threshold amount of torque to reduce the possibility of engine stalling. Further still, the electric machine torque is limited or constrained to a value that is less than zero so that electric machine torque may not increase positive driveline torque, thereby reducing the possibility of increasing driveline torque beyond engine torque.

Thus, the method of FIG. 4 provides for a powertrain operating method, comprising: adjusting a load of an electric machine via a controller in response to degradation of an engine sensor, the load of the electric machine adjusted according to an amount of power output from a high voltage battery; and adjusting output of an engine (e.g., engine torque) responsive to accelerator pedal position and the load of the electric machine in response to the degradation of the engine sensor. The method further comprises adjusting output of the engine in response to output of an engine airflow sensor in response to the degradation of the engine sensor not being present. The method includes where the engine sensor is a manifold absolute pressure sensor. The method includes where the engine sensor is a mass airflow sensor. The method further comprises preventing the electric machine from providing positive torque to a driveline in response to the degradation of the engine sensor. The method further comprises inhibiting automatic stopping of the engine when a vehicle in which the engine resides is moving. The method includes where the electric machine is positioned between the engine and a transmission in a driveline, and where the electric machine is selectively coupled to the engine via a driveline disconnect clutch. The method further comprises maintaining a driveline disconnect clutch in a locked state in response to the degradation of the engine sensor.

The method of FIG. 4 also provides for a powertrain operating method, comprising: adjusting a load of an electric machine as a function of an amount of electric power consumed via one or more electric power consumers via a controller in response to degradation of an engine sensor; and adjusting output of an engine responsive to accelerator pedal position and the amount of electric power consumed via the one or more electric power consumers in response to the degradation of the engine sensor. The method includes where the one or more electric power consumers include a DC/DC converter and an electrically operated air conditioning system. The method further comprises preventing the electric machine from supplying a positive torque to a driveline that includes the engine in response to the degradation of the engine sensor. This allows driveline torque to be maintained at or below the engine torque level so that the electric machine may not propel the vehicle via an error torque. The method further comprises preventing the electric machine from supplying a negative torque to the driveline that has a magnitude that is greater than a threshold magnitude in response to the degradation of the engine sensor. The method further comprises inhibiting automatic engine stopping in response to the degradation of the engine sensor. The method includes where the engine sensor is a mass airflow sensor or a manifold absolute pressure sensor.

In another representation, the method of FIG. 4 provides for a powertrain operating method, comprising: adjusting a load of an electric machine via a controller in response to degradation of an engine sensor, the load of the electric machine adjusted according to an amount of power output from a high voltage battery; adjusting a load of the electric machine in response to a difference between a driver demand torque and an engine torque in response to a lack of degradation of the engine sensor; and adjusting output of an engine responsive to accelerator pedal position and the load of the electric machine in response to the degradation of the engine sensor. The method includes adjusting output of the engine responsive to a driver demand torque and output of the engine sensor in response to lack of degradation of the engine sensor. The method includes where the engine sensor is a MAF sensor. The method includes where the engine sensor is a MAP sensor.

Referring now to FIG. 5, a plot of a function or relationship between torque converter impeller speed $\omega_{imp}$, accelerator pedal position $\alpha$, and electric machine torque is shown. The plot shows a plurality of curves $\alpha_1$–$\alpha_4$, where each of the curves represents electric machine torque for a constant accelerator pedal position (e.g., $\alpha_1$). The curves $\alpha_1$–$\alpha_4$ show that for lower impeller speeds, the magnitude of the negative or charging torque is lower, and for higher impeller speeds the magnitude of the negative or charging torque is higher. This allows the electric machine to provide additional charging torque to improve electric energy storage device charging when the engine is operating at higher speeds where the possibility of engine stalling may be reduced. Further, the curve $\alpha_1$ represents electric machine charging current when the accelerator pedal is applied a first smaller amount. The curve $\alpha_2$ represents electric machine charging current when the accelerator pedal is applied a second amount, the second amount larger than the first amount. Similarly, curve $\alpha_4$ represents electric machine charging current when the accelerator pedal is applied a fourth amount, the fourth amount larger than the first, second, and third amounts.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A powertrain operating method, comprising:
adjusting a load of an electric machine via a controller in response to degradation of an engine sensor, the load of the electric machine adjusted according to an amount of power output from a high voltage battery; and
adjusting output of an engine via a controller responsive to accelerator pedal position and the load of the electric machine in response to the degradation of the engine sensor.

2. The method of claim 1, where the engine sensor is a manifold absolute pressure sensor.

3. The method of claim 1, where the engine sensor is a mass airflow sensor.

4. The method of claim 1, further comprising preventing the electric machine from providing positive torque to a driveline in response to the degradation of the engine sensor.

5. The method of claim 1, further comprising inhibiting automatic stopping of the engine when a vehicle in which the engine resides is moving.

6. The method of claim 1, where the electric machine is positioned between the engine and a transmission in a driveline, and where the electric machine is selectively coupled to the engine via a driveline disconnect clutch.

7. The method of claim 1, further comprising maintaining a driveline disconnect clutch in a locked state in response to the degradation of the engine sensor.

8. A powertrain operating method, comprising:
adjusting a load of an electric machine as a function of an amount of electric power consumed via one or more electric power consumers via a controller in response to degradation of an engine sensor; and
adjusting output of an engine via the controller responsive to accelerator pedal position and the amount of electric power consumed via the one or more electric power consumers in response to the degradation of the engine sensor.

9. The method of claim 8, where the one or more electric power consumers include a DC/DC converter and an electrically operated air conditioning system.

10. The method of claim 8, further comprising preventing the electric machine from supplying a positive torque to a driveline that includes the engine in response to the degradation of the engine sensor.

11. The method of claim 10, further comprising preventing the electric machine from supplying a negative torque to the driveline that has a magnitude that is greater than a threshold magnitude in response to the degradation of the engine sensor.

12. The method of claim 8, further comprising inhibiting automatic engine stopping in response to the degradation of the engine sensor.

13. The method of claim 8, where the engine sensor is a mass airflow sensor or a manifold absolute pressure sensor.

14. A system, comprising:
an engine in a hybrid vehicle driveline;
an electric machine in the hybrid driveline;
a driveline disconnect clutch that selectively couples the engine to the electric machine; and
a controller including executable instructions stored in non-transitory memory to maintain the driveline disconnect clutch in a closed state in response to degradation of an engine airflow sensor.

15. The system of claim 14, further comprising additional instructions to adjust a load that the electric machine applies to the engine in response to degradation of an engine sensor, the load adjusted according to an amount of power output from a high voltage battery.

16. The system of claim 14, further comprising additional instructions to adjust a load that the electric machine applies to the engine in response to degradation of an engine sensor, the load adjusted according to an amount of electric power consumed via electric power consumers of a vehicle.

17. The system of claim 16, where the electric power consumers include an electrically operated air conditioning system.

18. The system of claim 16, where the electric power consumers include a DC/DC converter.

19. The system of claim 18, where the DC/DC converter transfers electric power between a first electric energy storage device and a second electric energy storage device.

* * * * *